(12) United States Patent
Glaser et al.

(10) Patent No.: US 10,705,491 B2
(45) Date of Patent: Jul. 7, 2020

(54) HYDRAULIC SYSTEM, METHOD, AND ARITHMETIC UNIT FOR PARAMETERIZING CONTROL ELECTRONICS OF A HYDRAULIC COMPONENT

(71) Applicant: HAWE HYDRAULIK SE, Munich (DE)

(72) Inventors: Johannes Glaser, Munich (DE); Stanley Buchert, Munich (DE); Paul Siegel, Munich (DE); Timotheus Wieringa, Munich (DE)

(73) Assignee: HAWE HYDRAULIK SE, Munich (DE)

( * ) Notice: Subject to any disclaimer, the term of this patent is extended or adjusted under 35 U.S.C. 154(b) by 302 days.

(21) Appl. No.: 15/484,522

(22) Filed: Apr. 11, 2017

(65) Prior Publication Data

US 2017/0293271 A1    Oct. 12, 2017

(30) Foreign Application Priority Data

Apr. 11, 2016   (DE) .................. 10 2016 205 971

(51) Int. Cl.
*G05B 13/04*   (2006.01)
*G05B 13/02*   (2006.01)
*G05D 7/06*    (2006.01)

(52) U.S. Cl.
CPC ......... *G05B 13/042* (2013.01); *G05B 13/024* (2013.01); *G05D 7/0623* (2013.01)

(58) Field of Classification Search
None
See application file for complete search history.

(56) References Cited

U.S. PATENT DOCUMENTS 7,493,482 B2   2/2009  Ring et al.
9,268,537 B1 *  2/2016  Zhang ................. G06F 8/35
(Continued)

FOREIGN PATENT DOCUMENTS

DE         19982944 T1    4/2001
DE      202012105021 U1   3/2014
DE      102014226620 A1   6/2016

OTHER PUBLICATIONS

German Examination Report dated Jan. 24, 2017, Application No. 10 2016 205 971.8, Applicant Hawe Hydraulik SE, 7 Pages.

*Primary Examiner* — Bernard G Lindsay
(74) *Attorney, Agent, or Firm* — Brooks Kushman P.C.

(57) ABSTRACT

A hydraulic system having a hydraulic device and at least one external database is provided. The hydraulic device comprises at least one hydraulic component, a control electronics having a memory to control the hydraulic component, and an identification element assigned to the hydraulic component. Specific parameters for the hydraulic component are stored in the external database, and the hydraulic component can be clearly identified by a configuration means via the identification element. The configuration means can be connected to the control electronics and the external database to access the specific parameters so that these can be transferred to the memory of the control electronics by means of the configuration means. Further, the disclosure relates to a method for parameterizing control electronics of a hydraulic device of a hydraulic system as well as an arithmetic unit for compiling a program code for the operation of a hydraulic assembly with several components.

23 Claims, 2 Drawing Sheets

(56) References Cited

U.S. PATENT DOCUMENTS

| | | | |
|---|---|---|---|
| 2001/0032031 A1 | 10/2001 | Ufheil | |
| 2014/0303591 A1* | 10/2014 | Peterfreund | G06F 19/3468 604/500 |
| 2015/0165114 A1* | 6/2015 | Grant | A61M 5/14586 604/151 |
| 2015/0230760 A1* | 8/2015 | Schneider | A61B 90/96 600/300 |
| 2016/0378076 A1* | 12/2016 | Hill | G05B 13/026 700/28 |
| 2017/0008754 A1* | 1/2017 | Schweble | B67D 7/346 |

\* cited by examiner

HYDRAULIC SYSTEM, METHOD, AND ARITHMETIC UNIT FOR PARAMETERIZING CONTROL ELECTRONICS OF A HYDRAULIC COMPONENT

CROSS-REFERENCE TO RELATED APPLICATIONS

This application claims foreign priority benefits under 35 U.S.C. § 119(a)-(d) to German patent application number DE 10 2016 205 971.8, filed Apr. 11, 2016, which is incorporated by reference in its entirety.

TECHNICAL FIELD

The present disclosure relates to a hydraulic system as well as a method for parameterizing control electronics of a hydraulic component. Further, the present disclosure relates to an arithmetic unit for compiling a program code for the operation of a hydraulic assembly.

BACKGROUND

Known hydraulic systems regularly include a hydraulic device with at least one hydraulic component and control electronics with a memory. The control electronics controls or regulates the operation of at least one hydraulic component that can be a hydraulic valve, hydraulic pump, a hydraulic motor, or a hydraulic cylinder, for example. For that, respective parameters such as for example operation data and functional data are stored in the memory of the control electronics.

In order to achieve an optimum result in the concrete case of application of the hydraulic system it is necessary to specifically adjust the corresponding parameters. For example this can be done by an iterative test method, that is the manual readjustment in the meaning of a "trial-and-error" approach. On the one hand, this is extremely complicated and laborious. On the other hand, in this way also it is not possible to ensure that indeed an optimum operation of the hydraulic system is achieved. As far as that goes the hydraulic systems on the manufacture side are delivered preconfigured to a large extent so that the end-user side implementation effort is limited.

Here, it should be noted that different but actually structurally similar hydraulic components are not completely identical. Not least due to the high tightness requirements in operation there result deviations in the operation characteristics of the hydraulic components by tolerances that cannot be excluded on part of the production. For example, here as a specific parameter the volume flow rate/pressure diagram with hydraulic valves is mentioned that is entirely slightly different between different, structurally similar hydraulic valves.

So, for example due to a necessary wear-related replacement of the hydraulic component it becomes necessary to adapt the control to the new hydraulic component. Correspondingly, also with a one-sided replacement of the control electronics also an adaption to the then already present hydraulic component would be necessary. The latter case results in a certain simplification if the parameters for the present hydraulic component already determined in advance are detected. Nevertheless, these parameters have to be transferred manually to the memory of the replaced control electronics. Further, in this case it is also not guaranteed that indeed an optimum operation of the hydraulic system is achieved, especially if the parameters were determined in advance by an iterative test method.

Moreover, this complex parameterization also acts on the operation of the hydraulic system. Especially when the hydraulic system or the hydraulic device, respectively, constitutes at least one of several components of a hydraulic assembly corresponding adaptions also in the program code for the operation of the hydraulic assembly would have to be made. Here, as an example a hydraulically controlled ventilating system can be mentioned that in addition to the hydraulic system also includes further components such as for example temperature sensors. In order to maintain the operation quality of the hydraulic assembly also after the replacement of a hydraulic component the corresponding program code would have to be adapted. For that, programming skills are required that are not always available on the spot.

SUMMARY

Thus, it is desirable to provide a hydraulic system in which the specific parameters for the hydraulic component can be fed into the memory of the control electronics with only low effort. Further, it is desirable to provide an arithmetic unit for a simplified compilation of a program code for the operation of a hydraulic assembly with several components.

Thus, according to the disclosure there is provided a hydraulic system having a hydraulic device and at least one external database. The hydraulic device comprises at least one hydraulic component, a control electronics having a memory to control the hydraulic component and an identification element assigned to the hydraulic component. In the external database specific parameters for the hydraulic component are stored. Specific parameters in the meaning of the disclosure should be understood especially as functional and operational parameters that are determined on the side of the manufacturer during the fabrication and final inspection of the hydraulic component, for example the characteristic curves characterizing the individual hydraulic component, such as volume flow rate/pressure diagrams with hydraulic valves. According to the disclosure the hydraulic component can be clearly identified by a configuration means via the identification element. The configuration means can be connected to the control electronics and the external database to access the specific parameters so that these can be transferred to the memory of the control electronics by means of the configuration means. According to the disclosure, a configuration means should be understood as the programming of a corresponding (mobile) terminal device, for example a laptop, a smartphone, or a tablet. Preferably, the terminal device has a wireless and/or wired communication interface.

That is, for parameterizing the control electronics of the hydraulic device at first there is clearly identified the at least one individual hydraulic component. This is done by the configuration means via the identification element assigned to the hydraulic component. Subsequently, the configuration means is connected to the external database. Thus, the configuration means accesses the external database and the specific parameters stored there. The specific parameters are retrieved and transferred to the memory of the control electronics by means of the configuration means. According to the disclosure, the specific parameters can be buffered by the configuration means or—with an existing connection to the control electronics and the external database—directly be transferred from the external database to the memory of the control electronics. In other words, the access to the external database to retrieve the specific parameters by means of the configuration means can be done both spatially and temporarily separated from the transfer to the memory of the control electronics.

This results in a particularly easy and remarkably less complex parameterization of the control electronics of the hydraulic device. Especially, this results also in the advantage that when replacing the control electronics and/or the at least one hydraulic component no complex re-parameterization has to be done, but the specific parameters for the clearly identifiable hydraulic component present in the database are transferred to the memory of the control electronics. Also, in this way in case of a reset of the control electronics the restoration of the parameterization can be done quickly and easily.

In the meaning of the disclosure the hydraulic device of the hydraulic system can comprise more than one clearly identifiable hydraulic component. In this case, each individual hydraulic component of the hydraulic device can be clearly identified by the configuration means via the identification element assigned to the hydraulic component. Then, the specific parameters for the individual hydraulic components are retrieved by the access to the external database and transferred to the memory of the control electronics. For example, this is of particular advantage with hydraulic components that are arranged in series and BUS controlled, since in this way the whole hydraulic device composed of several hydraulic components can be parameterized particularly quickly and easily.

Suitably, the control electronics comprises a wireless communication interface so that the configuration means can be wirelessly connected to the control. It is particularly suitable if the wireless communication interface is a Bluetooth interface. It is understood that the configuration means correspondingly can be connected to the control electronics via a wireless communication interface. This allows a particularly quick and easy pairing of communication means and control electronics. Since according to the disclosure hydraulic systems or hydraulic devices, respectively, are also employed in mobile hydraulic assemblies, for example in forestry and agriculture, the control electronics generally is made encapsulated to be protected against splashing water and dirt. Therefore, due to the wireless connection a complicated exposure of a wired communication interface is no longer necessary. Also, a wireless connection permits a spatial distance between configuration means and control electronics so that the control electronics itself can also be disposed at hardly accessible locations of the hydraulically driven machine.

Nevertheless, it is also conceivable that the control electronics has a wired communication interface so that the configuration means can be connected to the control electronics. This allows a particularly safe and low-cost connection between configuration means and control electronics.

It is of advantage when the identification means is a two-dimensional code. It is particularly advantageous when the two-dimensional code is a QR code. This allows a much higher density of information over the known one-dimensional codes. So, for example a particularly pronounced error correction may be added so that the two-dimensional code remains readable even over time and possible contaminations occurring thereupon.

Suitably, the configuration means can be connected to the external database via a network protocol. Especially, it is of advantage when the network protocol is an internet protocol.

As far as that goes the configuration means can access the external database via a WLAN, GPRS, or LTE connection, for example. This has particular advantages when the hydraulic system or the hydraulic device, respectively, is part of a mobile hydraulic assembly or a mobile hydraulically driven apparatus, for example a forestry apparatus. Therefore, parameterization can also be done independent of the location.

In a further development, the configuration means is configured to retrieve data from the memory of the control electronics. The data especially contain operating data and/or diagnosis data of the at least one hydraulic component. This has the advantage that possible errors can easily be displayed and recognized. Further, it is of advantage when the configuration means is configured to file the retrieved data in the external database. Thus, it is possible to analyze the data of the hydraulic component and thereby generate a gain in knowledge for an optimization potential. Further, in this way also safeguards or backups, respectively, of the memory can be prepared that can be transferred into the memory again after a reset of the control electronics.

Further, it is conceivable that the hydraulic system has the configuration means. For example, the configuration means may be configured to simultaneously constitute the operating element for the hydraulic device.

In addition, according to the disclosure there is provided a method for parameterizing the control electronics of a hydraulic component of a hydraulic system according to the disclosure which comprises the following steps: clearly identifying the at least one hydraulic component by the configuration means via the identification element; access of the configuration means to the external database; retrieval of the specific parameters for the at least one identified hydraulic component; and transferring the retrieved parameters to the memory of the control electronics.

As already described above with respect to the hydraulic system according to the disclosure parameterization of the control electronics is done with significantly less effort. Further, the method according to the disclosure also permits that retrieval of the specific data can be separated spatially and locally from the transfer to the memory of the control electronics.

It is also of advantage if the retrieved parameters are wirelessly transferred to the memory of the control electronics, wherein the retrieved parameters especially are transferred by a Bluetooth connection.

It is suitable if the hydraulic component is identified by optoelectronically scanning the identification element. In particular, it is of advantage if a two-dimensional code, for example a QR code, is optoelectronically scanned. In this way, the hydraulic component can be identified clearly in a quick and easy manner. Further, a QR code enables a high degree of error correction so that the readability of the QR code can be guaranteed even over a prolonged period of time of use of the hydraulic component.

It is of advantage if data are retrieved from the memory of the control electronics by the configuration means, wherein especially operating data and/or diagnosis data of the hydraulic component are retrieved. In this context, it is also of advantage if the retrieved data are transferred to the external database so that there result a quick and easy error correction as well as possibilities for an optimization, as already mentioned above.

According to the disclosure there is provided an arithmetic unit for compiling a program code for the operation of a hydraulic assembly with several components, wherein at least one component is formed of a hydraulic system according to the disclosure. The arithmetic unit is adapted to generate the program code from a control logic of the hydraulic assembly entered via a graphical user interface, wherein the components of the hydraulic assembly can be defined via the graphical user interface. The arithmetic unit is further adapted to retrieve the specific parameters of the hydraulic component from the external database and to integrate them into the program code; and to retrieve operating parameters for the further components from the external database and to integrate them into the program code.

Thus, it is possible to generate a control logic of the defined components via the graphical user interface in a quick and easy manner, wherein the required specific parameters are directly retrieved from the external database and integrated into the program code. That is, it is not necessary to enter isolated values for the various components individually when generating the program code. Therefore, the entire generation of the program code for the operation of the hydraulic assembly is extremely simple and intuitive, wherein the user of the arithmetic unit only needs a minimum of programming skills.

Suitably, the arithmetic unit is further adapted to define the at least one hydraulic component of the at least one hydraulic system based on the identification of the hydraulic component by the configuration means. Therefore, the hydraulic component in the graphical user interface is already defined as a component because this was already identified by the configuration means. This significantly simplifies the generation of the control logic, since the hydraulic component must not be identified individually via a drop-down menu, for example.

In the following, the disclosure is explained in detail with respect to examples shown in the drawings.

DETAILED DESCRIPTION

Figure 1:
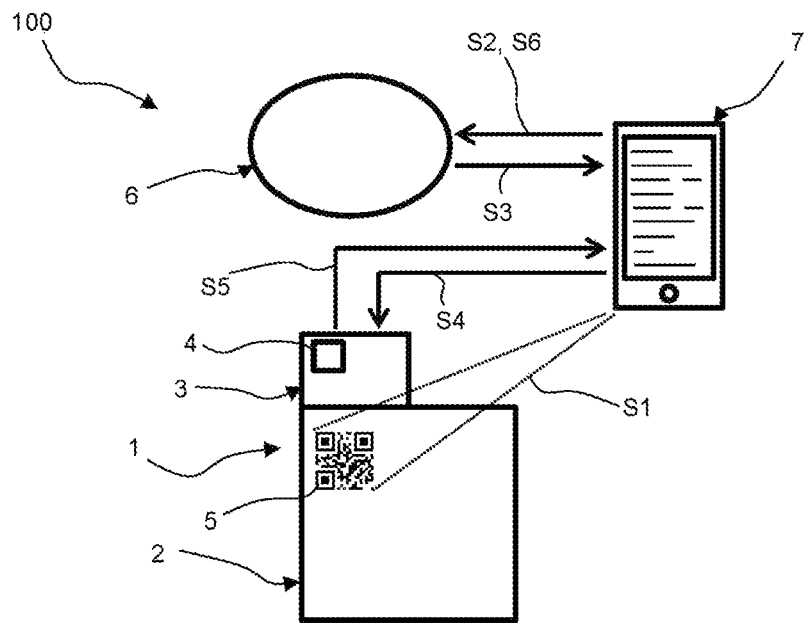
FIG. 1 schematically shows a first example of a hydraulic system having a hydraulic component.

In FIG. 1 a first example of a hydraulic system 100 according to the disclosure is shown. The hydraulic system 100 has a hydraulic device 1 with a hydraulic component 2. The hydraulic component 2 may be for example a proportional valve. Further, the hydraulic device 1 has a control electronics 3 with a memory 4. The control electronics 3 controls or regulates, respectively, the hydraulic device 1 or the hydraulic component 2, respectively. The control electronics 3 may be for example a plug amplifier for the hydraulic component 2 formed as a proportional valve. The control electronics 3 further has a (not illustrated) wireless communication interface that is formed as a Bluetooth interface in this example.

An identification element 5 having a QR code is assigned to the hydraulic component 2 so that this can clearly be identified via the identification element 5. The identification element 5 may be formed for example as an adhesive label with the QR code printed thereon. Advantageously, the identification element 5 is arranged on the hydraulic component 2 such that the identification element 5 can be optoelectronically scanned without any problems, as will be described hereinafter.

Moreover, the hydraulic system 100 has an external database 6. The external database 6 is spatially separated from the hydraulic device, i.e., from the hydraulic component 2 and the control electronics 3. In the external database 6 there are stored specific parameters for the hydraulic component 2. These specific parameters especially comprise operating and functional data of the hydraulic component 2, for example volume flow rate/pressure diagrams determined during the final inspection by the factory.

Further, a configuration means 7 is provided. In this example the configuration means 7 comprises a correspondingly programmed conventional smartphone that is adapted to perform the steps described below due to the application that is available thereon. Of course, such a smartphone has various communication interfaces, for example via an optical interface, a Bluetooth interface, a WLAN interface, and an interface for the mobile communication (GSM, UMTS, LTE, 4G, etc.)

The configuration means 7 can be connected to the control electronics 3 via a Bluetooth connection. The Bluetooth connection or the pairing, respectively, of the configuration means 7 and the control electronics 3 is conventionally done and is not described in detail here. However, communication between configuration means 7 and control electronics 3 in principal may be password-protected or encoded, respectively, so that an undesired unauthorized access to the control electronics 3 can effectively be prevented.

In the following the parameterization of the control electronics 3 of the hydraulic device 1 is exemplarily described. First, the hydraulic component 2 is clearly identified by optoelectronically scanning the QR code of the identification element 5. For that, the QR code is scanned via the optical interface of the configuration means 7. This step is illustrated in FIG. 1 as S1. Then, the configuration means 7 at the user's instigation or automatically accesses the external database 6. For example, this may be done via a network or internet protocol by means of the WLAN interface of the configuration means 7. This step is illustrated in FIG. 1 as S2. Subsequently, parameters specific for the clearly identified hydraulic component 2 are retrieved from the external database 6, wherein this step in FIG. 1 is illustrated as S3. The retrieved specific parameters are then transferred to the memory 4 of the control electronics 3 by means of the configuration means 7 via the Bluetooth connection. This step is illustrated in FIG. 1 as S4. Depending on whether the specific parameters are retrieved from the external database 6 in a spatially and/or temporarily separated manner by the configuration means 7, the specific parameters are buffered in the configuration means 7.

Now, the control electronics 3 is parameterized such that the individual parameters specifying the hydraulic component 2 are stored in the memory 4 of the control electronics 3 so that an optimum control or regulation, respectively, of the hydraulic device 1 in operation can take place.

Further, the configuration means 7 is designed to retrieve data from the memory 4 of the control electronics 3. For example, these data can comprise actual operating data, diagnosis data, or error messages. Retrieval of said data is illustrated in FIG. 1 as S5. On the one hand, in this way for example it is possible to directly show the state of the hydraulic component 2 in a display of the configuration means 7 to the user. Moreover, the retrieved data may also be transferred to the external database 6 by the configuration means 7. This, on the one hand, is for saving the retrieved data. On the other hand, in this way it is possible to gain knowledge from the data. The transfer of the retrieved data from the configuration means 7 to the external database 6 is illustrated in FIG. 1 as S6.

Figure 2:
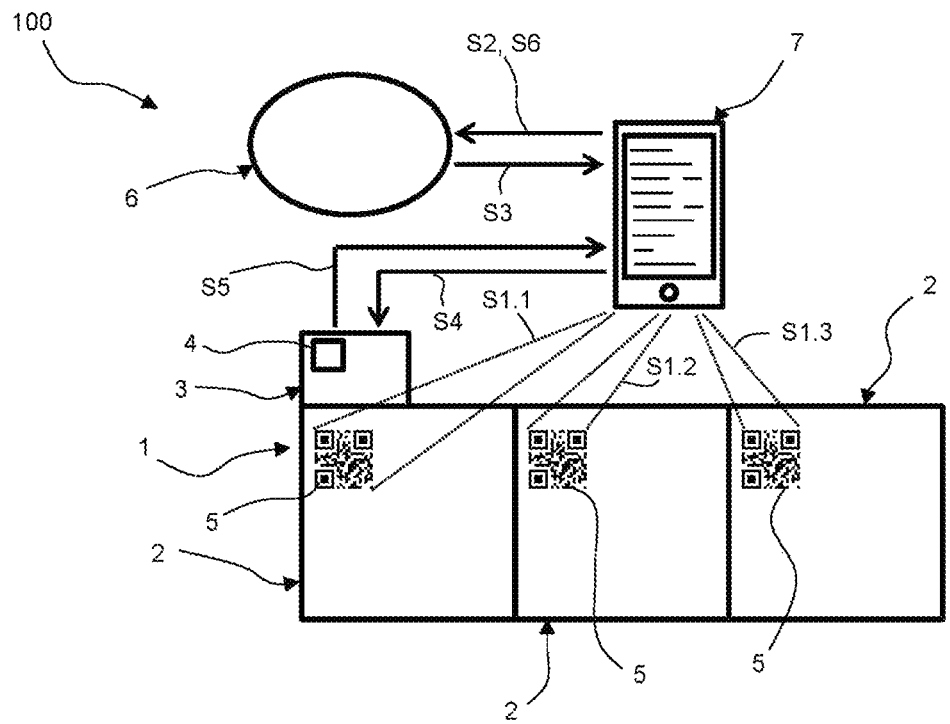
FIG. 2 schematically shows a second example of a hydraulic system having several hydraulic components.

In FIG. 2 a second example of a hydraulic system 100 according to the disclosure is shown. The hydraulic system 100 shown in FIG. 2 differs from the hydraulic system 100 shown in FIG. 1 in that the hydraulic device 1 has three hydraulic components 2 that each have an identification element 5 assigned to the corresponding hydraulic component 2. Moreover, the control electronics 3 is configured to control or regulate, respectively, all three hydraulic components 2 and thus, the hydraulic device 1. Especially, the hydraulic components 2 can be configured as a valve bank with series connection, wherein the control electronics 3, for example in the form of a CAN bus control electronics, controls or regulates, respectively, the valve bank.

Parameterization of the control electronics 3 is substantially identical to the parameterization described with respect to FIG. 1. The difference can be seen in that not only a QR code of an identification element 5 is optoelectronically scanned, but the QR code of each of the identification elements 5 of the three individual hydraulic components 2 one after the other. These three single steps are illustrated in FIG. 2 as S1.1, S1.2, and S1.3.

Thus, the configuration means 7 retrieves the specific parameters for the three clearly identified hydraulic components 2 from the external database 6 in step S3 and transfers them to the memory 4 of the control electronics 3 in step S4. Accordingly, also the data of the individual hydraulic components 2 can be retrieved from the memory 4 of the control electronics 3 by the configuration means 7 and transferred to the external database 6.

Figure 3:
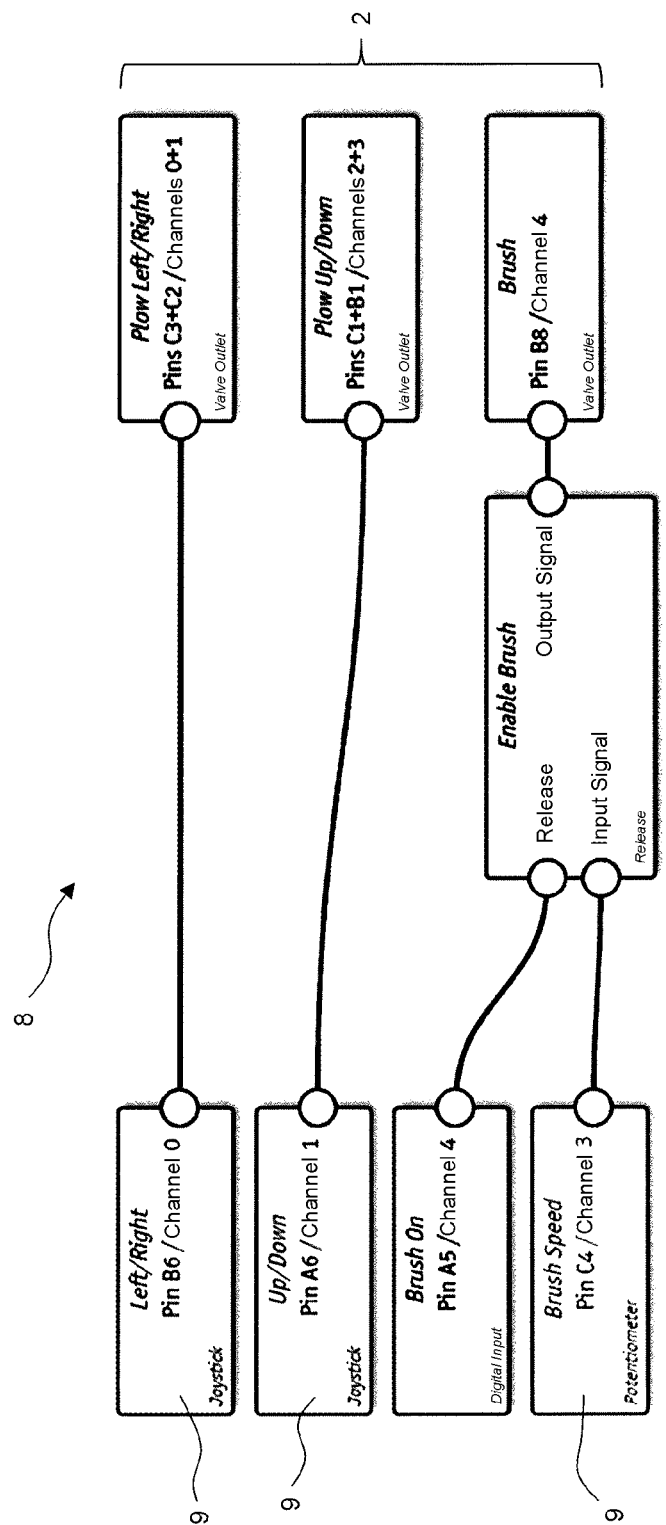
FIG. 3 schematically shows an exemplary illustration of a control logic generated via a graphical user interface.

FIG. 3 exemplarily shows a control logic of a hydraulic assembly entered via a graphical user interface 8. In this example, the hydraulic assembly is a brush of a local road sweeper, wherein in addition to the hydraulic system 100 with a corresponding hydraulic component 2 formed as a valve a potentiometer and an operating unit are defined as a further component 9. Hydraulic component 2 was clearly identified by the user in advance by the configuration means 7 via the identification element 5 so that the hydraulic component 2 is directly defined in the graphic user interface 8 by the arithmetic unit (not illustrated) accessing the external database 6.

This graphical user interface 8 is shown to the user by an arithmetic unit (not illustrated), wherein the user defines the individual components 2, 9 in accordance with a "Drag and Drop" principle and generates the control logic by linking the defined components 2, 9 to each other. In this example, the brush can be hydraulically moved upwards, downwards, to the left and to the right by moving a joystick of the operating element by linking the corresponding valve outlet to the direction of motion of the joystick, as shown. The brush itself is also switched on and off via the operating element with additionally considering the measured values for the brush speed generated by the potentiometer.

After the user has generated the control logic with the help of the graphical user interface 8 this can be compiled by the arithmetic unit into a program code and transferred to the control electronics of the hydraulic assembly. Here, the arithmetic unit accesses the external database 6 to retrieve the specific parameters of the hydraulic component 2 and to integrate them into the program code to be compiled.

What is claimed is:

1. A hydraulic system comprising:
   a hydraulic device including a hydraulic component, a control electronics to control the hydraulic component and having a memory, and an identification element assigned to the hydraulic component;
   an external database; and
   an arithmetic unit for compiling a program code for the hydraulic device;
   wherein the hydraulic component can be individually identified by a configuration means via the identification element;
   wherein specific parameters for the identified hydraulic component are storable in the external database, the specific parameters including a functional parameter specifically associated with the identified hydraulic component;
   wherein the configuration means is configured to be connected to the control electronics and the external database to access the specific parameters for the identified hydraulic component so that the specific parameters can be transferred to the memory of the control electronics by the configuration means; and
   wherein the arithmetic unit is configured to integrate at least one of the specific parameters into the program code, and the arithmetic unit is further configured to compile the program code so that the program code includes user generated control logic for determining at least one control operation of the hydraulic device.

2. The hydraulic system according to claim 1 wherein the control electronics has a wireless communication interface so that the configuration means can be wirelessly connected to the control electronics.

3. The hydraulic system according to claim 2 wherein the wireless communication interface is a Bluetooth interface.

4. The hydraulic system according to claim 1 wherein the control electronics has a wired communication interface so that the configuration means can be connected wire-based to the control electronics.

5. The hydraulic system according to claim 1 wherein the identification means has a two-dimensional code.

6. The hydraulic system according to claim 5 wherein the two-dimensional code is a QR code.

7. The hydraulic system according to claim 1 wherein the configuration means can be connected to the external database via a network protocol.

8. The hydraulic system according to claim 7 wherein the network protocol comprises an internet protocol.

9. The hydraulic system according to claim 1 wherein the configuration means is configured to retrieve data from the memory of the control electronics, wherein the data comprise operating data and/or diagnosis data of the hydraulic component.

10. The hydraulic system according to claim 1 wherein the hydraulic system comprises the configuration means.

11. The hydraulic system according to claim 1 wherein the functional parameter comprises volume flow rate data.

12. The hydraulic system according to claim 1 wherein the control logic is generatable using a graphical user interface.

13. The hydraulic system according to claim 1 wherein the arithmetic unit is further configured to retrieve, from the external database, operating parameters for further components associated with the hydraulic system and integrate the operating parameters into the program code.

14. A method for parameterizing control electronics of a hydraulic device of a hydraulic system that also includes an external database, wherein the hydraulic device further includes a hydraulic component and an identification element assigned to the hydraulic component, and wherein the control electronics are configured to control the hydraulic component, the method comprising:

individually identifying the hydraulic component by a configuration means via the identification element;

accessing the external database by the configuration means;

retrieving specific parameters for the identified hydraulic component from the external database, the specific parameters including a functional parameter specifically associated with the identified hydraulic component;

transferring the retrieved specific parameters for the identified hydraulic component to a memory of the control electronics; and compiling a program code for the hydraulic device using an arithmetic unit, wherein the arithmetic unit is configured to integrate at least one of the specific parameters into the program code, and wherein the compiling is performed so that the program code includes user generated control logic that determines at least one control operation of the hydraulic device.

15. The method according to claim 14 wherein the retrieved parameters are wirelessly transferred to the memory of the control electronics.

16. The method according to claim 15 wherein the retrieved parameters are transferred to the memory of the control electronics by a Bluetooth connection.

17. The method according to claim 14 wherein the hydraulic component is identified via optoelectronically scanning the identification element.

18. The method according to claim 14 wherein data of the hydraulic component are retrieved from the memory of the control electronics by the configuration means.

19. The method according to claim 18 wherein the data comprise operating data and/or diagnosis data of the hydraulic component.

20. The method according to claim 18 wherein the retrieved data are transferred to the external database.

21. The method according to claim 14 wherein the functional parameter comprises volume flow rate data.

22. An arithmetic unit for compiling a program code for operation of a hydraulic device of a hydraulic system that also includes an external database, wherein the hydraulic device includes a hydraulic component, a control electronics having a memory and being configured to control the hydraulic component, and an identification element assigned to the hydraulic component, and wherein the arithmetic unit is configured to:

define the hydraulic component of the hydraulic system based on identification of the hydraulic component by a configuration means via the identification element;

retrieve specific parameters for the identified hydraulic component from the external database, the specific parameters including a functional parameter specifically associated with the identified hydraulic component;

transfer the retrieved specific parameters for the identified hydraulic component to the memory of the control electronics; and compile the program code for the hydraulic device so that the program code includes user generated control logic for determining at least one control operation of the hydraulic device, wherein the arithmetic unit is configured to integrate at least one of the specific parameters into the program code.

23. The arithmetic unit according to claim 22 wherein the arithmetic unit is further configured to retrieve, from the external database, an operating parameter for another component associated with the hydraulic system and integrate the operating parameter into the program code.

* * * * *